United States Patent
Ge et al.

(10) Patent No.: US 11,860,419 B2
(45) Date of Patent: Jan. 2, 2024

(54) OPTICAL COMMUNICATION DEVICE AND OPTICAL SIGNAL PROCESSING METHOD

(71) Applicant: HUAWEI TECHNOLOGIES CO., LTD., GuangDong (CN)

(72) Inventors: Zhaojiang Ge, Wuhan (CN); Fei Gao, Wuhan (CN); Tao Liu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/958,839

(22) Filed: Oct. 3, 2022

(65) Prior Publication Data

US 2023/0026205 A1    Jan. 26, 2023

Related U.S. Application Data

(63) Continuation of application No. PCT/CN2020/083960, filed on Apr. 9, 2020.

(51) Int. Cl.
*G02B 6/28* (2006.01)
*G02B 6/293* (2006.01)

(52) U.S. Cl.
CPC ....... *G02B 6/2856* (2013.01); *G02B 6/29353* (2013.01)

(58) Field of Classification Search
CPC  G02B 6/2856; G02B 6/29353; G02B 6/4215; G02B 6/29362
See application file for complete search history.

(56) References Cited

U.S. PATENT DOCUMENTS

| | | | | |
|---|---|---|---|---|
| 5,408,559 A | * | 4/1995 | Takahashi | G02B 6/422 385/89 |
| 6,493,121 B1 | * | 12/2002 | Althaus | G02B 6/4246 398/139 |
| 6,571,033 B2 | * | 5/2003 | Caracci | G02B 6/4246 385/47 |
| 9,250,401 B2 | * | 2/2016 | Lim | G02B 6/4215 |
| 2001/0000316 A1 | | 4/2001 | Kawai | |

(Continued)

FOREIGN PATENT DOCUMENTS

CN   203745693 U   7/2014
CN   107045168 A   8/2017
(Continued)

*Primary Examiner* — Tina M Wong
(74) *Attorney, Agent, or Firm* — Rimon PC

(57) ABSTRACT

An optical communication device includes two optical transmitting devices, two optical receiving devices, an optical path component, and an optical fiber adapter. A first converging lens packaged in each of the optical transmitting devices converges a light beam emitted by a light source, and provides the converged light beam for the optical path component. A second converging lens packaged in each of the optical receiving devices converges a light beam from the optical path component, and provides the converged light beam for a photoelectric detection element. The optical path of the optical communication device is simplified and the process costs are reduced. In addition, the quantity of used lenses is reduced, correspondingly reducing the quantity of optical coupling dimensions between mechanical parts and improving production efficiency of combined passive optical network (Combo PON) products.

17 Claims, 7 Drawing Sheets

(56) References Cited

U.S. PATENT DOCUMENTS

| | | | | |
|---|---|---|---|---|
| 2007/0104426 A1* | 5/2007 | Yun | ................. | H04B 10/25891 |
| | | | | 385/47 |
| 2008/0193135 A1* | 8/2008 | Du | .................... | G02B 6/29362 |
| | | | | 398/88 |
| 2010/0209103 A1* | 8/2010 | Sakigawa | ............ | G02B 6/4214 |
| | | | | 398/45 |
| 2012/0262900 A1* | 10/2012 | Sugitatsu | ............. | G02B 6/4204 |
| | | | | 362/19 |
| 2013/0108262 A1 | 5/2013 | Lim et al. | | |
| 2016/0154194 A1 | 6/2016 | Kim | | |
| 2017/0082803 A1* | 3/2017 | Hong | ................... | G02B 27/145 |
| 2018/0269971 A1 | 9/2018 | Tang et al. | | |

FOREIGN PATENT DOCUMENTS

| | | |
|---|---|---|
| CN | 108152897 A | 6/2018 |
| CN | 108776374 A | 11/2018 |
| CN | 208140989 U | 11/2018 |
| CN | 109683260 A | 4/2019 |
| CN | 110673278 A | 1/2020 |
| CN | 110806623 A | 2/2020 |
| CN | 110824632 A | 2/2020 |

\* cited by examiner

OPTICAL COMMUNICATION DEVICE AND OPTICAL SIGNAL PROCESSING METHOD

CROSS-REFERENCE TO RELATED DISCLOSURES

This application is a continuation of International Application No. PCT/CN2020/083960, filed on Apr. 9, 2020, the disclosure of which is hereby incorporated by reference in its entirety.

TECHNICAL FIELD

This application relates to the field of optical device technologies, and in particular, to an optical communication device and an optical signal processing method.

BACKGROUND

An optical communication device is a commonly used device in the optical communication field, and is usually used to transfer optical signals and perform bidirectional conversion between an optical signal and an electrical signal. As the requirements for an optical communication rate in an optical network service are increasing, rate increasing poses a challenge to a passive optical network (PON), In other words, it is required that a passive optical network with a lower communication rate be converted into a passive optical network with a higher communication rate.

However, because the PON has wide coverage, the innovation of a PON technology needs to be gradually popularized and promoted. Therefore, it is difficult to upgrade the PON through rate increasing in a wide range in a short time. In recent years, suppliers of optical communication devices have successively designed combined passive optical network (Combo PON) products, and use the Combo PON products as transition products in a PON rate increasing process. Currently, a Combo PON product can be made compatible with performance of two types of different PON devices before and after rate increasing. In other words, the Combo PON product not only can be compatible with access services of a large quantity of PONs deployed at an earlier stage, but also can satisfy an access service of a PON that implements a higher rate.

For example, the Combo PON product may receive and transmit optical signals from two types of PONs by using a quad-directional optical communication device. The quad-directional optical communication device includes two optical transmit ends and two optical receive ends. For example, a first PON is a PON whose rate is to be increased, and a second PON is a PON whose rate is increased. One transmit end and one receive end of the quad-directional optical communication device are respectively used to transmit and receive optical signals corresponding to the first PON, and the other transmit end and the other receive end of the quad-directional optical communication device are respectively used to transmit and receive optical signals corresponding to the second PON. In this way, the Combo PON product implements compatibility between a low-rate PON and a high-rate PON.

Currently, an optical communication device used in an existing Combo PON product has a complex structure, and consumes a relatively large quantity of materials during manufacturing. As a result, material costs and manufacturing process costs are relatively high. In addition, production efficiency is affected due to structure complexity.

As the demand of Combo PON products is increasing, how to reduce the costs of Combo PON products and improve production efficiency of Combo PON products while ensuring performance has become a technical problem that urgently needs to be resolved in this field.

SUMMARY

This application provides an optical communication device and an optical signal processing method, to reduce costs of Combo PON products and improve production efficiency of the Combo PON products.

According to a first aspect of this application, an optical communication device is provided. The optical communication device includes a first optical transmitting device, a second optical transmitting device, a first optical receiving device, a second optical receiving device, an optical path component, and an optical fiber adapter, where a light source and a first converging lens are packaged in each of the first optical transmitting device and the second optical transmitting device, and the first converging lens is configured to: converge a light beam emitted by the light source, and provide a converged light beam to the optical path component;

the optical path component is configured to: combine light beams from the first optical transmitting device and the second optical transmitting device, and send a combined light beam to the optical fiber adapter;

the optical path component is further configured to: receive a light beam from the optical fiber adapter, and send the light beam to the first optical receiving device and the second optical receiving device; and a second converging lens and a photoelectric detection element are packaged in each of the first optical receiving device and the second optical receiving device, and the second converging lens is configured to converge the light beam received by the optical path component, and provide a converged light beam to the photoelectric detection element.

The optical transmitting devices and the optical receiving devices can converge light beams by using the converging lenses packaged in the optical transmitting devices and the optical receiving devices. In this way, there is no need to arrange excessive lenses on a spatial optical path not including the optical transmitting devices and the optical receiving devices, so that a quantity of used lenses is reduced, and material saving is achieved. In addition, complexity of the spatial optical path is reduced, process costs are reduced, and production efficiency is improved.

In a first implementation of the first aspect, the optical path component includes a first light filter, a second light filter, and a light filter component;

the first light filter is disposed on a transmission path of a first light beam transmitted by the first optical transmitting device and on a transmission path of a second light beam transmitted by the second optical transmitting device, and the first light filter is configured to transmit the first light beam and reflect the second light beam;

both the second light filter and the light filter component are disposed on a transmission path of the light beam from the optical fiber adapter, where the second light filter is configured to reflect a light beam with a third wavelength in the light beam from the optical fiber adapter to the first optical receiving device; and the light filter component is configured to reflect a light beam with a fourth wavelength in the light beam from the optical fiber adapter to the second optical receiving device.

With reference to the first implementation of the first aspect, in a second implementation of the first aspect, the optical path component further includes a first lens. The first lens is disposed between the first light filter and the second light filter, and is configured to: converge a light beam from the first light filter, and provide a converged light beam to the second light filter; and the second light filter is further configured to provide, to the optical fiber adapter through transmission, the light beam provided by the first lens.

With reference to the second implementation of the first aspect, in a third implementation of the first aspect, the optical path component further includes a second lens. The second lens is disposed between the light filter component and the optical fiber adapter. The second lens is configured to: converge, to the optical fiber adapter, a light beam provided by the light filter component; and when receiving a light beam from the optical fiber adapter, converge the light beam, and provide a converged light beam to the light filter component.

With reference to the first, second, or third implementation of the first aspect, the light filter component includes a third light filter and a fourth light filter. The third light filter and the second optical receiving device are located on a same side of the fourth light filter;
  the third light filter is disposed between the second light filter and the optical fiber adapter, and is configured to: transmit the light beam with the third wavelength to the second light filter, and reflect the light beam with the fourth wavelength to the fourth light filter; and
  the fourth light filter is configured to reflect a light beam from the third light filter to the second optical receiving device.

With reference to the first, second, or third implementation of the first aspect, the optical path component further includes a fifth light filter, where
  the fifth light filter is disposed between the first optical receiving device and the second light filter; and the fifth light filter is perpendicular to an optical axis of the second converging lens packaged in the first optical receiving device, and is configured to further filter the light beam reflected by the second light filter. A light wave with a detection wavelength corresponding to the photoelectric detection element in the first optical receiving device can be filtered out through further filtering, thereby optimizing optical communication quality.

With reference to the first, second, or third implementation of the first aspect, the optical path component further includes a sixth light filter, where
  the sixth light filter is disposed between the second optical receiving device and the light filter component; and the sixth light filter is perpendicular to an optical axis of the second converging lens packaged in the second optical receiving device, and is configured to further filter the light beam reflected by the light filter component. A light wave with a detection wavelength corresponding to the photoelectric detection element in the second optical receiving device can be filtered out through further filtering, thereby optimizing optical communication quality.

With reference to the first, second, or third implementation of the first aspect, the optical path component further includes an optical isolator. The optical isolator is disposed between the first light filter and the second light filter, and is configured to isolate light transmitted from the second light filter to the first light filter. The optical isolator isolates a light wave reflected back to an optical transmitting device, thereby preventing the optical transmitting device from being damaged and avoiding impact on optical communication quality.

Optionally, a wavelength of the first light beam and a wavelength of the second light beam both fall within a waveband of a wave that can be isolated by the optical isolator. In this way, a quantity of used optical isolators is reduced.

With reference to the first, second, or third implementation of the first aspect, the first converging lens packaged in the first optical transmitting device and/or the second optical transmitting device is an aspheric lens.

With reference to the first, second, or third implementation of the first aspect, both the first light beam and the second light beam are converging light beams.

With reference to the second or third implementation of the first aspect, both the first light beam and the second light beam are parallel light beams.

With reference to the first, second, or third implementation of the first aspect, both the first optical transmitting device and the second optical transmitting device are packaged according to a TO56 package specification, and both the first optical receiving device and the second optical receiving device are packaged according to a TO46 package specification. In this way, material universality is improved.

With reference to the second or third implementation of the first aspect, the first lens and the optical fiber adapter jointly serve as an independent first structural member, and the first optical transmitting device and the first structural member are optically coupled to form a second structural member.

With reference to the second or third implementation of the first aspect, the first lens and the first optical transmitting device jointly serve as an independent third structural member, and an optical fiber coupler and the third structural member are optically coupled to form a fourth structural member.

With reference to the foregoing assembly implementations, a quantity of lenses is reduced, and a quantity of coupling dimensions in an assembly process is reduced, thereby improving assembly production efficiency.

According to a second aspect of this application, an optical signal processing method is provided. The method is applied to the optical communication device provided in any implementation of the first aspect. The method includes:
  when both the first optical transmitting device and the second optical transmitting device are in a transmitting state, combining, by using the optical path component, light beams transmitted by the first optical transmitting device and the second optical transmitting device, and sending a combined light beam to the optical fiber adapter; and
  processing the light beam from the optical fiber adapter when the light beam is received, and sending a processed light beam to a corresponding optical receiving device in the first optical receiving device and the second optical receiving device.

With reference to the second aspect, in a possible implementation, the processing the light beam from the optical fiber adapter when the light beam is received, and sending a processed light beam to a corresponding optical receiving device in the first optical receiving device and the second optical receiving device includes:

when the light beam from the optical fiber adapter includes a light beam with a third wavelength and a light beam with a fourth wavelength, splitting the light beam from the optical fiber adapter, sending the light beam with the third wavelength to the first optical receiving device, and sending the light beam with the fourth wavelength to the second optical receiving device.

It can be learned from the foregoing technical solutions that embodiments of this application have the following advantages:

The optical communication device provided in this application includes the two optical transmitting devices and the two optical receiving devices, and further includes the optical path component and the optical fiber adapter. The two optical transmitting devices and the two optical receiving devices each are packaged with a converging lens; the first converging lens in the optical transmitting device converges a light beam emitted by the light source, and provides a converged light beam to the optical path component; and the second converging lens in the optical receiving device converges a light beam from the optical path component, and provides a converged light beam to the photoelectric detection element. The optical transmitting devices and the optical receiving devices can converge light beams. Therefore, it is unnecessary to configure a relatively large quantity of lenses in the optical path component to construct a complex optical path to implement optical transmission, thereby reducing material costs of the optical communication device. Moreover, by simplifying an optical path, complexity of the optical path is reduced, and process costs are reduced. In addition, a quantity of used lenses is reduced, so that a quantity of dimensions of optical coupling between structural members in the device is correspondingly reduced, thereby improving production efficiency of Combo PON products.

DESCRIPTION OF EMBODIMENTS

In an optical communication device used in a current Combo PON product, for example, a quad-directional optical communication device, to construct a parallel optical path, at least five lenses usually need to be used on a spatial optical path not including four ends (two optical transmitting devices and two optical receiving devices). In addition, flat window lenses are packaged in the optical transmitting device and the optical receiving device. A flat window lens does not affect a direction of a light beam. Therefore, in the optical communication device, collimation and convergence of the light beam can only be ensured by using the lenses disposed on the spatial optical path not including the four ends. The optical communication device uses a relatively large quantity of lenses, leading to a complex optical path, high processing difficulty, and low production efficiency. As a result, production costs of the optical communication device are relatively high.

Based on the foregoing problem, embodiments of this application provide a novel optical communication device and an optical signal processing method through research. In embodiments of this application, a first converging lens is packaged inside an optical transmitting device, so that the optical transmitting device has a function of converging a light beam; and a second converging lens is packaged inside an optical receiving device, so that the optical receiving device has a function of converging a light beam. For the optical communication device implemented in the foregoing manner, a quantity of lenses that need to be used is greatly reduced, complexity of an optical path is reduced, and material costs and process costs in a production process can be reduced, thereby effectively improving production efficiency.

For ease of understanding, a quad-directional optical communication device is used as an example for description and explanation in the following embodiments. In actual application, technical solutions protected in embodiments of this application are not limited to the quad-directional optical communication device, that is, not limited to a quantity of optical transmitting devices and a quantity of optical receiving devices in the quad-directional optical communication device.

With reference to accompanying drawings, the following describes an implementation of an optical communication device X1 provided in embodiments of this application.

Figure 1:
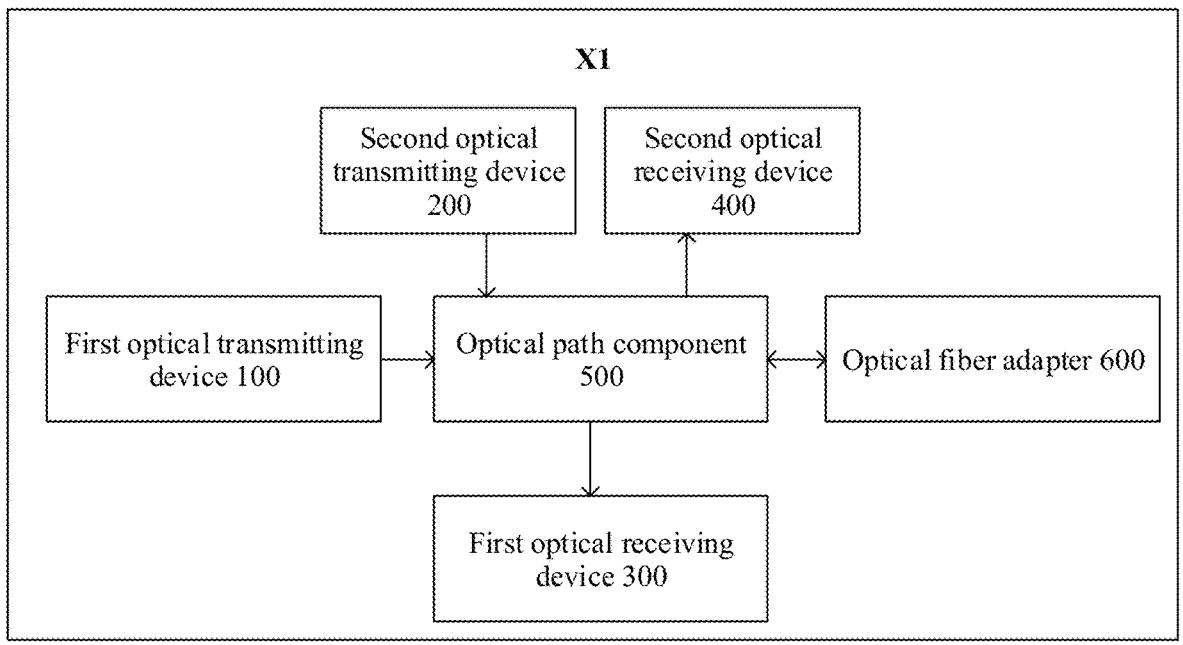
FIG. 1 is a schematic diagram of a structure of an optical communication device according to an embodiment of this application.

FIG. 1 is a schematic diagram of a structure of an optical communication device X1 according to an embodiment of this application. As shown in FIG. 1, the optical communication device X1 provided in this embodiment includes a first optical transmitting device 100, a second optical transmitting device 200, a first optical receiving device 300, a second optical receiving device 400, an optical path component 500, and an optical fiber adapter 600.

The first optical transmitting device 100 and the second optical transmitting device 200 serve two different PON services, and the first optical receiving device 300 and the second optical receiving device 400 serve two different PON services. Generally, operating wavelengths of four ends are different. It is assumed that a wavelength of a light wave transmitted by the first optical transmitting device 100 is $\lambda 1$, a wavelength of a light wave transmitted by the second optical transmitting device 200 is $\lambda 2$, a wavelength of a light wave received by the first optical receiving element 300 is $\lambda 3$, and a wavelength of a light wave received by the second optical receiving device is $\lambda 4$.

In an example implementation, $\lambda 1 > \lambda 2 > \lambda 3 > \lambda 4$. The first optical transmitting device 100 and the second optical receiving device 400 serve a 10 gigabit Ethernet passive optical network (10G EPON) service. The first optical transmitting device 100 transmits light with a wavelength $\lambda 1 = 1577$ nm during operation, and the second optical receiving device 400 receives light with a wavelength $\lambda 4 = 1270$ nm during operation. The second optical transmitting device 200 and the first optical receiving device 300 serve a gigabit passive optical network (GPON) service. The second optical transmitting device 200 transmits light with a wavelength $\lambda 2=1490$ nm during operation, and the first optical receiving device 300 receives light with a wavelength $\lambda 3=1310$ nm during operation. In this example implementation, a GPON is used as a PON whose rate is to be increased, and a 10G EPON is used as a PON whose rate is increased.

In some embodiments, the first optical transmitting device 100, the second optical transmitting device 200, the first optical receiving device 300, and the second optical receiving device 400 each is packaged with a converging lens. The converging lenses may be used as tube caps for packaging the optical transmitting devices 100 and 200 and the optical receiving devices 300 and 400. For ease of differentiation, the converging lenses packaged in the two optical transmitting devices 100 and 200 are referred to as first converging lenses; and the converging lenses packaged in the two optical receiving devices 300 and 400 are referred to as second converging lenses.

In addition, the two optical transmitting devices 100 and 200 each further include a light source; and the two optical receiving devices 300 and 400 each further include a photoelectric detection element. For example, the photoelectric detection element may be an avalanche photodiode chip. When the first optical receiving device 300 and the second optical receiving device 400 operate, the second converging lens packaged in each of the first optical receiving device 300 and the second optical receiving device 400 converges a light beam to the avalanche photodiode chip, and the avalanche photodiode chip converts an optical signal into an electrical signal.

For each optical transmitting device in the optical transmitting devices 100 and 200, the packaged first converging lens may be used as the last optical element through which light emitted by the light source passes in the optical transmitting device. For each optical receiving device in the optical receiving devices 300 and 400, the packaged second converging lens may be used as the first optical element through which light received by the optical receiving device from the outside passes.

In a possible implementation, the first converging lens packaged in the first optical transmitting device 100 and/or the second optical transmitting device 200 may be an aspheric lens. The aspheric lens is packaged in the optical transmitting device, to improve efficiency of optical coupling between the optical transmitting device and another device, reduce impact of aberration, and improve optical transmission quality.

In a possible implementation, the second converging lens packaged in the first optical receiving device 300 and/or the second optical receiving device 400 may be any one of the following: a water droplet lens, a spherical lens, or an aspheric lens. Packaging a water droplet lens in the optical receiving device is a fast and relatively low-cost implementation.

The first converging lenses are packaged, so that the first optical transmitting device 100 and the second optical transmitting device 200 each have a function of converging a light beam, and a light beam emitted by the light source is converged through the first converging lens, and a converged light beam is provided to the optical path component 500. The second converging lenses are packaged, so that the first optical receiving device 300 and the second optical receiving device 400 each have a function of converging a light beam, and light from the optical path component 500 is converged through the second converging lens, and converged light is provided to the photoelectric detection element. In this way, a quantity of lenses that need to be provided on the spatial optical path not including the optical receiving devices and the optical transmitting devices is reduced.

In a possible implementation, the first optical transmitting device 100 and the second optical transmitting device 200 are packaged according to a TO56 coaxial package specification; and the first optical receiving device 300 and the second optical receiving device 400 are packaged according to a TO46 coaxial package specification. Compared with an existing optical transmitting device packaged according to a TO38 specification in the industry, the optical transmitting devices packaged according to the foregoing specification can improve material universality.

The optical communication device X1 provided in some embodiments of this application can implement functions of single-fiber bidirectional transmitting and receiving. The device X1 performs interactive optical signal transmission with the outside by using the optical fiber adapter 600. A main function of the optical path component 500 in the device X1 is light beam processing, for example, combining processing and splitting processing. The function of the optical path component 500 is described in detail below.

In the optical communication device X1, the first optical transmitting device 100 and the second optical transmitting device 200 each are usually continuously in an operating state. To be specific, the first optical transmitting device 100 continuously transmits light waves with a wavelength $\lambda 1$, and the second optical transmitting device 200 continuously transmits light waves with a wavelength 2. Operating states of the first optical receiving device 300 and the second optical receiving device 400 depend on that the optical communication device X1 receives, by using the optical fiber adapter 600, a light wave with a wavelength $\lambda 3$ and a light wave with a wavelength $\lambda 4$. For example, if the optical communication device X1 receives the light wave with the wavelength $\lambda 3$, the first optical receiving device 300 operates to convert the received light wave with the wavelength $\lambda 3$ into an electrical signal. Similarly, if the optical communication device X1 receives the light wave with the wavelength $\lambda 4$, the second optical receiving device 400 operates to convert the received light wave with the wavelength $\lambda 4$ into an electrical signal.

In some embodiments of this application, functions of the optical path component 500 are embodied in two aspects. In one aspect, when the optical communication device X1 is configured to transmit an optical signal to the outside, the optical path component 500 is configured to: combine light beams transmitted by the first optical transmitting device 100 and the second optical transmitting device 200, and transmit a combined light beam to the optical fiber adapter 600. In the other aspect, when the optical communication device X1 is configured to receive an optical signal transmitted from the outside, the optical path component 500 is further configured to: process a light beam from the optical fiber adapter 600 when receiving the light beam, and transmit a processed light beam to a corresponding optical receiving device in the first optical receiving device 300 and the second optical receiving device 400. Specifically, if the light beam received by the optical path component 500 from the optical fiber adapter 600 includes both a light wave with the wavelength $\lambda 3$ and a light wave with the wavelength $\lambda 4$, the optical path component 500 is specifically configured to: split the light beam, provide the light wave with the wavelength $\lambda 3$ in the light beam to the first optical receiving device 300, and provide the light wave with the wavelength λ4 in the light beam to the second optical receiving device 400.

In actual application, for the optical path component 500, there may be a plurality of possible implementations. For example, no lens is disposed in the optical path component 500, one lens is disposed in the optical path component 500, or two lenses are disposed in the optical path component 500. For a quad-directional optical communication device commonly used in the industry, five to six lenses usually need to be disposed in a spatial optical path not including four ends of the quad-directional optical communication device to construct a parallel optical path, and flat window lenses are packaged inside the four ends. Therefore, a relatively large quantity of lenses are used. However, in this embodiment of this application, first converging lenses are packaged in the optical transmitting devices 100 and 200 instead of flat window lens, and second converging lenses are packaged in the optical receiving devices 300 and 400 instead of flat window lens, the optical path component 500 can converge, to the optical fiber adapter 600 by using only 0 to 2 lenses, light beams transmitted by the optical transmitting devices 100 and 200, process a light beam from the optical fiber adapter 600, and provide a processed light beam to the optical receiving device 300 or 400 corresponding to a wavelength. It can be learned that, for the optical communication device X1 provided in this embodiment of this application, materials that need to be used are reduced. Compared with a parallel optical path, in this embodiment, bidirectional transmitting and receiving functions of the device X1 are mainly implemented by constructing a converging optical path, and complexity of the optical path is reduced because a quantity of lenses is reduced, thereby reducing process costs. In addition, the converging lenses are integrated at the four ends, and a quantity of lenses used in the optical path component 500 is reduced, thereby reducing a quantity of dimensions of optical coupling in the device X1, shortening production time, and improving production efficiency.

As mentioned above, for the optical path component 500, there may be a plurality of possible implementations. For example, no lens is disposed in the optical path component 500, one lens is disposed in the optical path component 500, or two lenses are disposed in the optical path component 500. To facilitate understanding of various variant implementations of the optical path component 500, the following provides descriptions with reference to the accompanying drawings.

First, an implementation in which no lens is disposed in the optical path component 500 is described.

Figure 2:
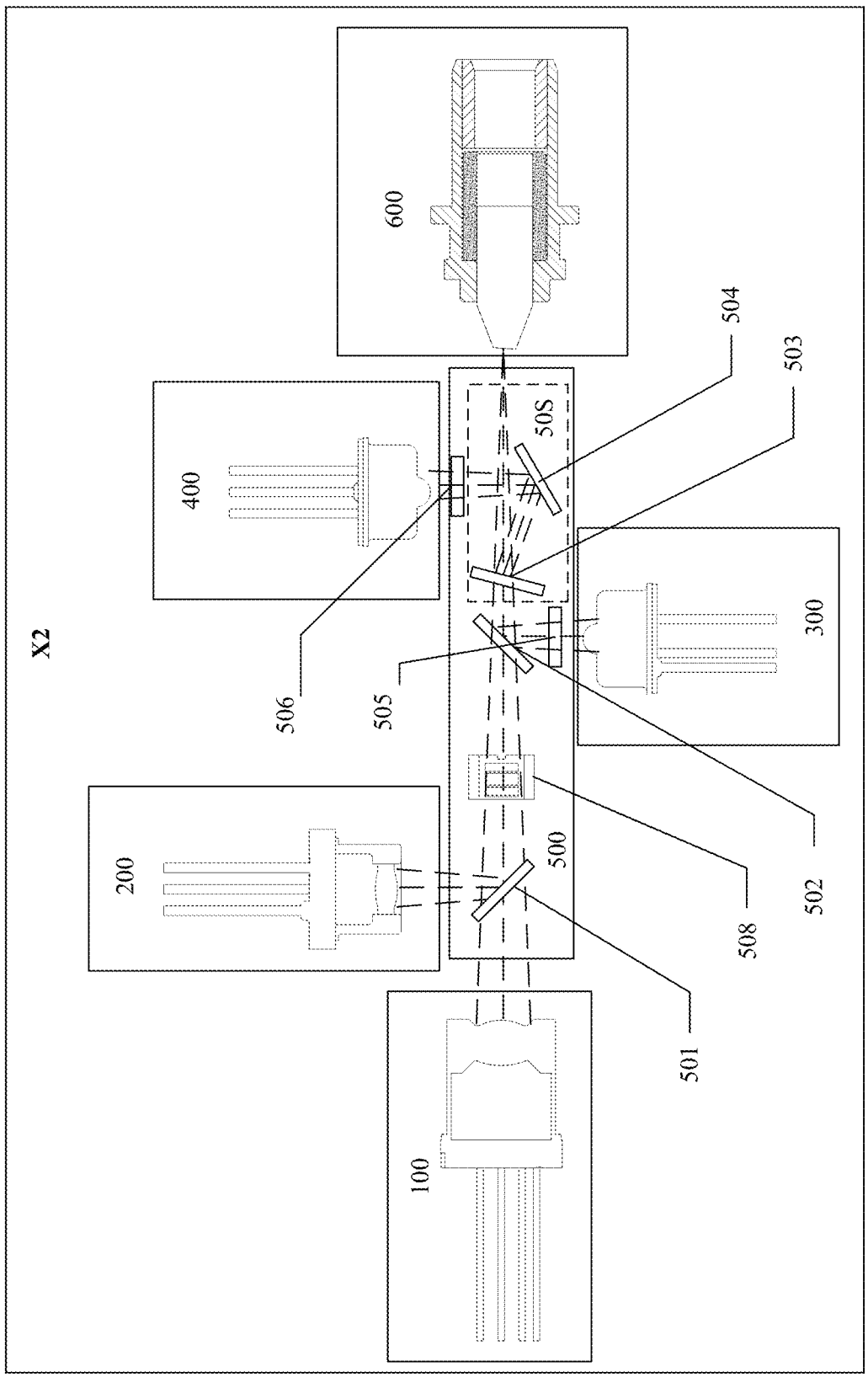
FIG. 2 is a schematic diagram of a structure of another optical communication device according to an embodiment of this application.

FIG. 2 is a schematic diagram of a structure of another optical communication device X2 according to an embodiment of this application. In the optical communication device X2 illustrated in this figure, structures of four ends (100, 200, 300, and 400) are basically the same as those in FIG. 1. Therefore, the structures of the four ends are not described herein again.

An optical path component 500 in the optical communication device X2 includes a first light filter 501, a second light filter 502, and a light filter component 50S. The first light filter 501 is disposed on a transmission path of a first light beam (with a wavelength λ1) transmitted by the first optical transmitting device 100 and on a transmission path of a second light beam (with a wavelength λ2) transmitted by the second optical transmitting device 200. The first light filter 501 is configured to transmit the first light beam and reflect the second light beam.

Both the second light filter 502 and the light filter component 50S are disposed on a transmission path of a light beam from an optical fiber adapter 600. The second light filter 502 is configured to reflect, to the first optical receiving device 300, a light beam with a third wavelength (λ3) in the light beam from the optical fiber adapter 600, and the light filter component 50S is configured to reflect, to the second optical receiving device 400, a light beam with a fourth wavelength (λ4) in the light beam from the optical fiber adapter 600.

As shown in FIG. 2, in actual application, the light filter component 50S may be disposed on a light transmission path between the optical fiber adapter 600 and the second light filter 502. Therefore, the second light filter 502 may provide, to the first optical receiving device 300, light transmitted by the light filter component 50S. The second light filter 502 and the light filter component 50S may be disposed on a light transmission path between the first light filter 501 and the optical fiber adapter 600. The first light beam transmitted by the first light filter 501 and the second light beam reflected by the first light filter 501 are successively transmitted by the second light filter 502 and the light filter component 50S, and then are converged to the optical fiber adapter 600.

In the optical communication device X2 shown in FIG. 2, light transmitted by both the first optical transmitting device 100 and the second optical transmitting device 200 is converging light. Therefore, even if the optical path component 500 does not include a lens, the first light beam and the second light beam may also be converged to the optical fiber adapter 600.

In an implementation of the optical path component 500 in FIG. 2, the light filter component 50S includes a plurality of light filters: a third light filter 503 and a fourth light filter 504. In this implementation, the third light filter 503 and the second optical receiving device 400 are located on a same side of the fourth light filter 504. The third light filter 503 in the light filter component 50S is disposed between the second light filter 502 and the optical fiber adapter 600, and the third light filter 503 is configured to: transmit a light beam with the third wavelength to the second light filter 502, and reflect a light beam with the fourth wavelength to the fourth light filter 504. Because the third light filter 503 and the second optical receiving device 400 are located on the same side of the fourth light filter 504, after the third light filter 503 reflects a light beam to the fourth light filter 504, the fourth light filter 504 may reflect, to the second optical receiving device 400 on the same side as the third light filter 503, the light beam incident to the fourth light filter 504. Finally, the second optical receiving device 400 receives a light wave with the wavelength λ4, and completes photoelectric conversion on the light wave.

Figure 3:
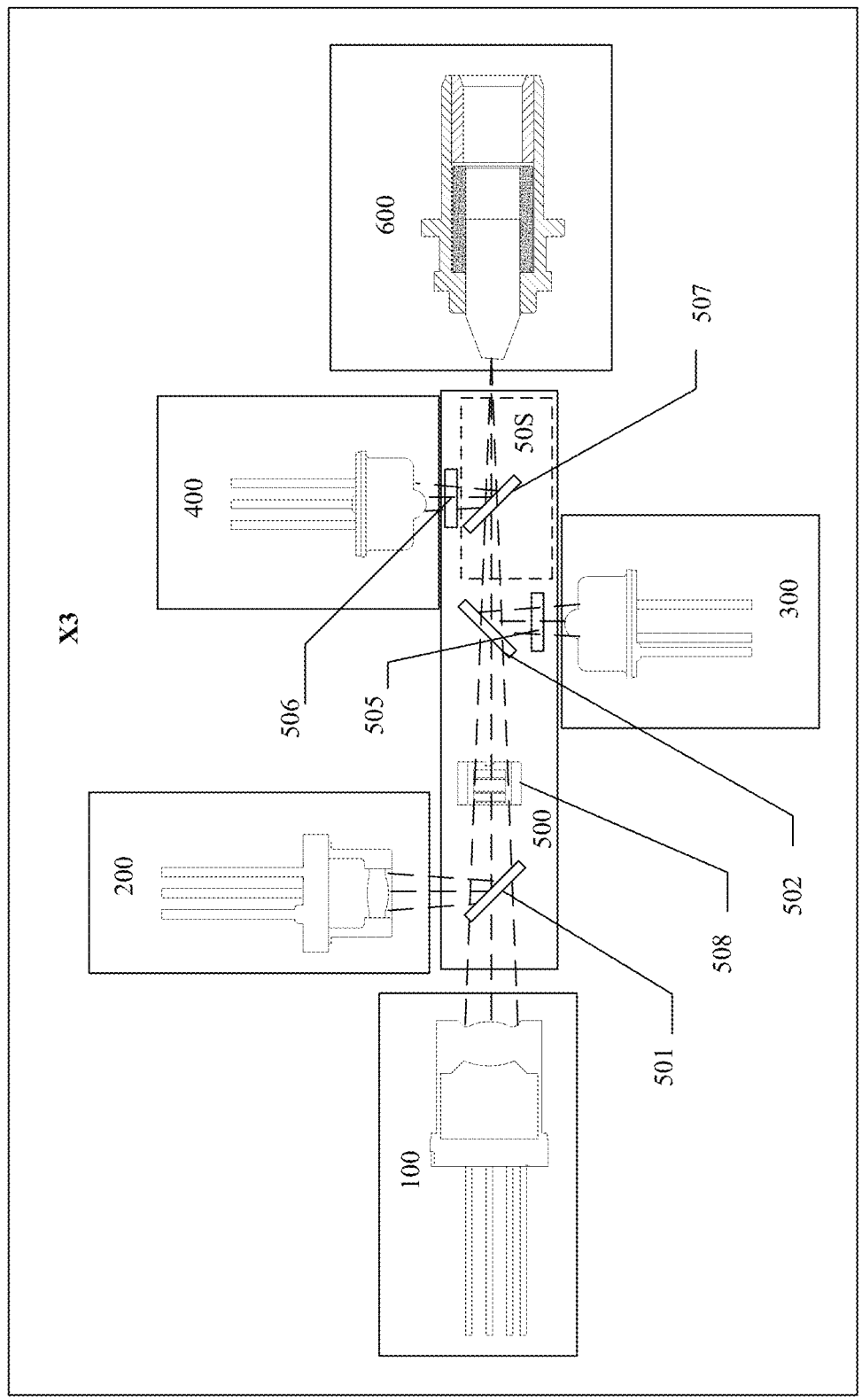
FIG. 3 is a schematic diagram of a structure of still another optical communication device according to an embodiment of this application.

In the implementation shown in FIG. 2, the light filter component 50S successively reflects a light wave with the wavelength λ4 through the two light filters 503 and 504. In actual application, the light filter component 50S is not limited to the implementation shown in FIG. 2. FIG. 3 is a schematic diagram of a structure of still another optical communication device X3 according to an embodiment of this application. Compared with the optical communication device X2, in the optical communication device X3 illustrated in FIG. 3, a difference is that a light filter component 50S includes only a seventh light filter 507. The seventh light filter 507 independently completes a function of the light filter component 50S, that is, reflecting a light wave with the wavelength λ4 to the second optical receiving device 400 at a time, and transmitting a light wave with the wavelength λ3 to the second light filter 502, so that the second light filter 502 reflects the light wave to the first optical receiving device 300.

Compared with the device X2, in the optical communication device X3, the light wave with the wavelength λ4 is reflected at a time through the single light filter 507 in the light filter component 50S. In this way, a quantity of used light filters is reduced, thereby further simplifying optical path design. To facilitate understanding of manners in which light filters in the optical communication devices X2 and X3 are disposed, the following provides a description with reference to an example implementation.

In one embodiment, a direction pointing to the optical fiber adapter 600 from the first optical transmitting device 100 along an optical axis of the first converging lens in the first optical transmitting device 100 is set as a first direction. For example, in the optical communication devices X2 and X3, an included angle between the first light filter 501 and the first direction is 135°, and an included angle between the second light filter 502 and the first direction is 45°. For the optical communication device X2, an included angle between the third light filter 503 and the first direction is greater than 45° and less than 90°, and an included angle between the fourth light filter 504 and the first direction is greater than 0° and less than 45°. For the optical communication device X3, an included angle between the seventh light filter 507 and the first direction is 135°.

It should be noted that, the setting angles of the light filters provided in the foregoing example are not used as a limitation on actual setting angles. In actual application, a position of each light filter may be set based on an actual requirement of the optical communication device for occupied space, an assembly manner and assembly positions of the four ends, and the like. Therefore, the setting angles of the light filters are not specifically limited in this embodiment.

In actual application, to ensure quality of a transmitted signal and avoid damage caused to the device because a reverse light beam is incident to the first optical transmitting device 100 and the second optical transmitting device 200, in the optical communication devices shown in FIG. 2 and FIG. 3, the optical path component 500 may further include an optical isolator 508.

In a possible implementation, the optical isolator 508 may be disposed between the first light filter 501 and the second light filter 502. Light passes in a forward direction of the optical isolator 508 but is cut off in a reverse direction of the optical isolator 508. Therefore, a first light beam and a second light beam can be transmitted along the optical isolator 508 in a direction in which the second light filter is located, but light reversely transmitted from the second light filter 502 to the first light filter 501 is blocked by the optical isolator 508. In actual application, the optical isolator 508 used may be a two-stage optical isolator. To reduce costs, the optical isolator 508 used may alternatively be a single-stage optical isolator. When a single-stage optical isolator 508 is selected, wavelengths of light beams transmitted by the first optical transmitting device 100 and the second optical transmitting device 200 both need to fall within a waveband of a wave that can be isolated by the optical isolator 508. In other words, the selected single-stage optical isolator 508 needs to achieve an effect of unidirectionally isolating light waves corresponding to λ1 and λ2.

In actual application, the optical communication devices provided in the foregoing embodiments may have the following problems: (1) the second light filter 502 reflects a light wave with the wavelength λ3 and a light wave with a wavelength other than λ3 to the first optical receiving device 300; and (2) the light filter component 50S reflects a light wave with the wavelength λ4 and a light wave with a wavelength other than λ4 to the second optical receiving device 400. The problem (1) may affect quality of an optical signal received by the first optical receiving device 300, affecting function implementation of the first optical receiving device 300. Similarly, the problem (2) may affect quality of an optical signal received by the second optical receiving device 400, affecting function implementation of the second optical receiving device 400.

For the problem (1), as shown in FIG. 2 and FIG. 3, the optical path component 500 in the optical communication devices provided in embodiments of this application may further include a fifth light filter 505. The fifth light filter 505 may be disposed between the first optical receiving device 300 and the second light filter 502. In an implementation, the fifth light filter 505 is perpendicular to an optical axis of the second converging lens packaged in the first optical receiving device 300. Before light enters the first optical receiving device 300, the fifth light filter 505 further filters a light beam provided by the second light filter 502 through reflection, that is, filters out the light wave with the wavelength other than the wavelength λ3. This ensures that a wavelength of a light beam entering the first optical receiving device 300 satisfies a requirement of a PON service served by the first optical receiving device 300.

For the problem (2), as shown in FIG. 2 and FIG. 3, the optical path component 500 in the optical communication devices provided in embodiments of this application may further include a sixth light filter 506. The sixth light filter 506 may be disposed between the second optical receiving device 400 and the light filter component 50S. In an implementation, the sixth light filter 506 is perpendicular to an optical axis of the second converging lens packaged in the second optical receiving device 400. Before light enters the second optical receiving device 400, the sixth light filter 506 further filters a light beam provided by the light filter component 50S through reflection, that is, filters out the light wave with the wavelength other than the wavelength λ4. This ensures that a wavelength of a light beam entering the second optical receiving device 400 satisfies a requirement of a PON service served by the second optical receiving device 400.

The following describes an implementation in which one lens is disposed in the optical path component 500.

Figure 4:
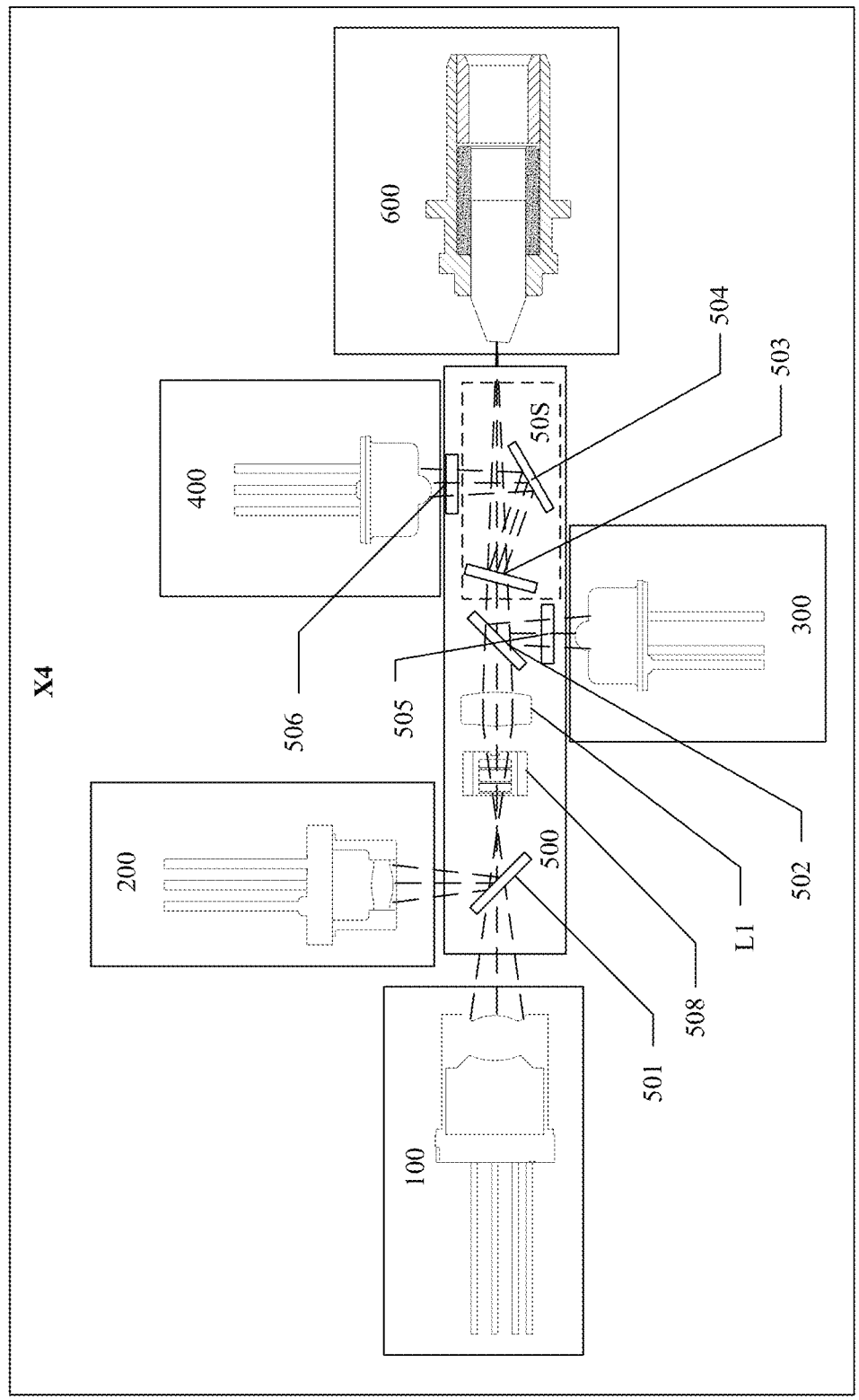
FIG. 4 is a schematic diagram of a structure of yet another optical communication device according to an embodiment of this application.

FIG. 4 is a schematic diagram of a structure of yet another optical communication device X4 according to an embodiment of this application. In the optical communication device X4 illustrated in this figure, structures of four ends (100, 200, 300, and 400) are basically the same as those in FIG. 1. Therefore, the structures of the four ends are not described herein again. In addition, passive devices (the optical isolator 508 and the light filters 501 to 506) included in the optical communication device X2 shown in FIG. 2 are also included in an optical path component 500 in the optical communication device X4. In the foregoing embodiments, manners in which the foregoing passive devices are disposed and functions of the passive devices have been described one by one. Therefore, details are not described herein again.

It should be noted that, in the optical communication device X4 provided in some embodiments of this application, the optical isolator 508, the fifth light filter 505, and the sixth light filter 506 are all optional passive devices, but are not necessary passive devices.

Different from the device X2 shown in FIG. 2, the optical path component 500 in the optical communication device provided in FIG. 4 further includes a first lens L1. The first lens L1 is disposed between the first light filter 501 and the second light filter 502, and is configured to: converge a light beam from the first light filter 501, and provide a converged light beam to the second light filter 502. In this embodiment, the second light filter 502 is further configured to provide, to an optical fiber adapter 600 through transmission, the light beam provided by the first lens L1.

With reference to the foregoing description and FIG. 4, it can be learned that, in the device X4, a main function of the first lens L1 is converging a first light beam transmitted by the first light filter 501 and a second light beam reflected by the first light filter 501, so that the light beams can be converged to the optical fiber adapter 600 through the first lens L1.

In one embodiment, the optical isolator 508 may be disposed between the first light filter 501 and the first lens L1, as shown in FIG. 4. In another possible implementation, the optical isolator 508 may alternatively be disposed between the first lens L1 and the second light filter 502.

In FIG. 4, a light filter component 50S in the optical path component 500 includes a third light filter 503 and a fourth light filter 504. Similar to FIG. 3, to reduce a quantity of used light filters and simplify an optical path, the third light filter 503 and the fourth light filter 504 in the light filter component 50S in the optical path component 500 shown in FIG. 4 may alternatively be replaced with an independent seventh light filter. For details, refer to FIG. 5.

Figure 5:
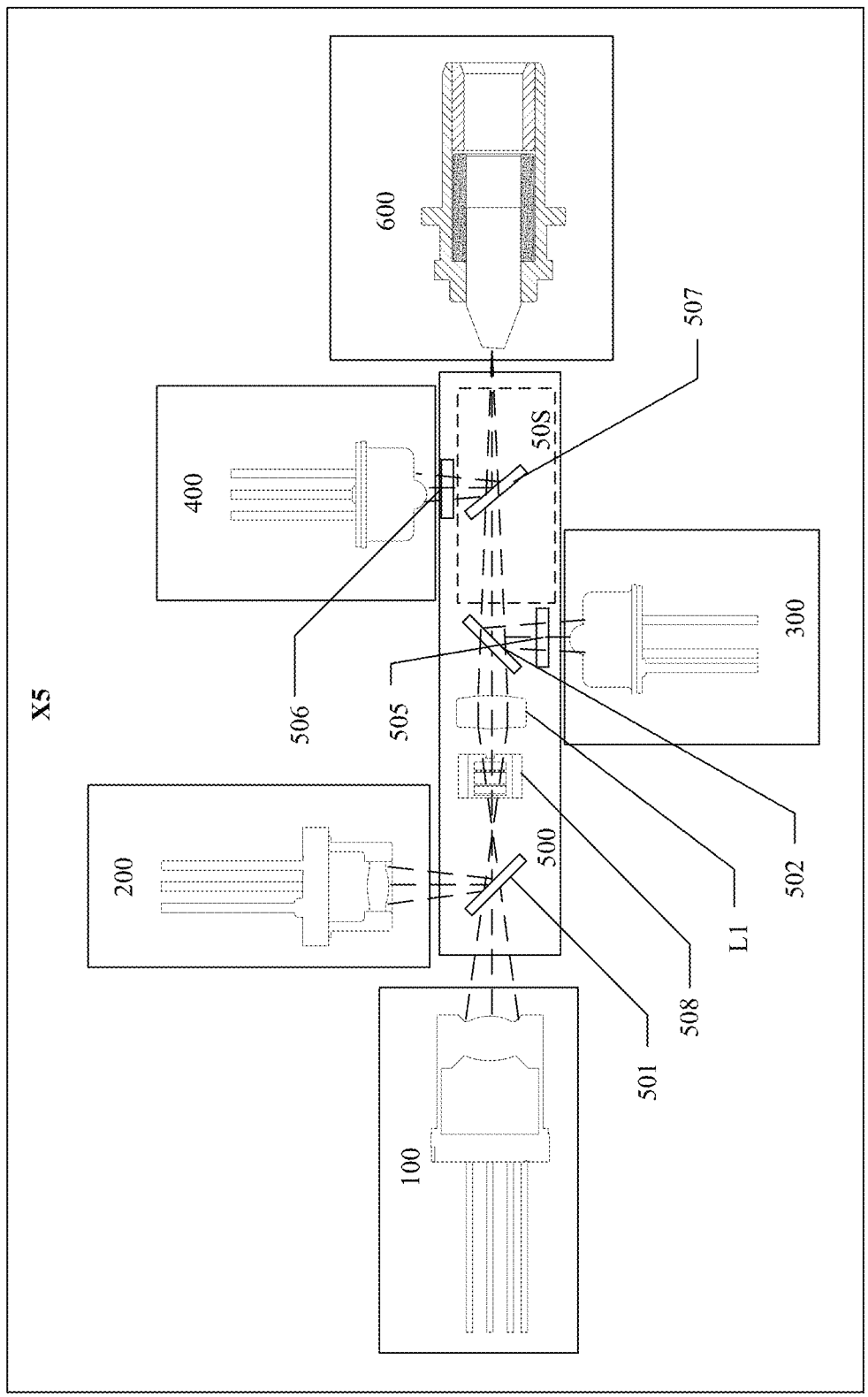
FIG. 5 is a schematic diagram of a structure of another optical communication device according to an embodiment of this application.

FIG. 5 is a schematic diagram of a structure of another optical communication device X5 according to an embodiment of this application. A difference between FIG. 5 and FIG. 4 lies in that light filter components 50S are implemented in different manners. In the optical communication device X5, the light filter component 50S includes a seventh light filter 507. A light wave with a wavelength λ4 can be reflected to a second optical receiving device 400 by performing reflection by the seventh light filter 507 at a time. In this way, a quantity of light filters is reduced, thereby further simplifying an optical path.

It should be noted that, because the optical path components 500 in the optical communication devices illustrated in FIG. 4 and FIG. 5 each include a first lens L1 that can implement a light converging function, regardless of whether the two optical transmitting devices 100 and 200 transmit parallel light beams or converging light beams, the optical path component 500 can converge the parallel light beams or the converging light beams to the optical fiber adapter 600. In other words, both a first light beam and a second light beam may be light beams emergent in parallel, or may be light beams emergent in a converging manner.

In the optical communication devices illustrated in FIG. 4 and FIG. 5, if both the first light beam and the second light beam are converging light beams, the first lens L1 converts the converging light beams into converging light beams again to extend an optical path, so that the first light beam and the second light beam are converged at longer distances from the optical transmitting devices. On an incident side of the first lens L1, there may be a relatively large difference between a numerical aperture of a light spot and a numerical aperture of a light spot required for the optical fiber adapter 600. As a result, coupling efficiency is low. However, the first lens L1 is used to repeatedly converge a light beam, so that a numerical aperture of a light spot of a light beam converged to the optical fiber adapter 600 is closer to the numerical aperture of the light spot required for the optical fiber adapter 600. This improves optical coupling efficiency.

The following describes an implementation in which two lenses are disposed in the optical path component 500.

Figure 6:
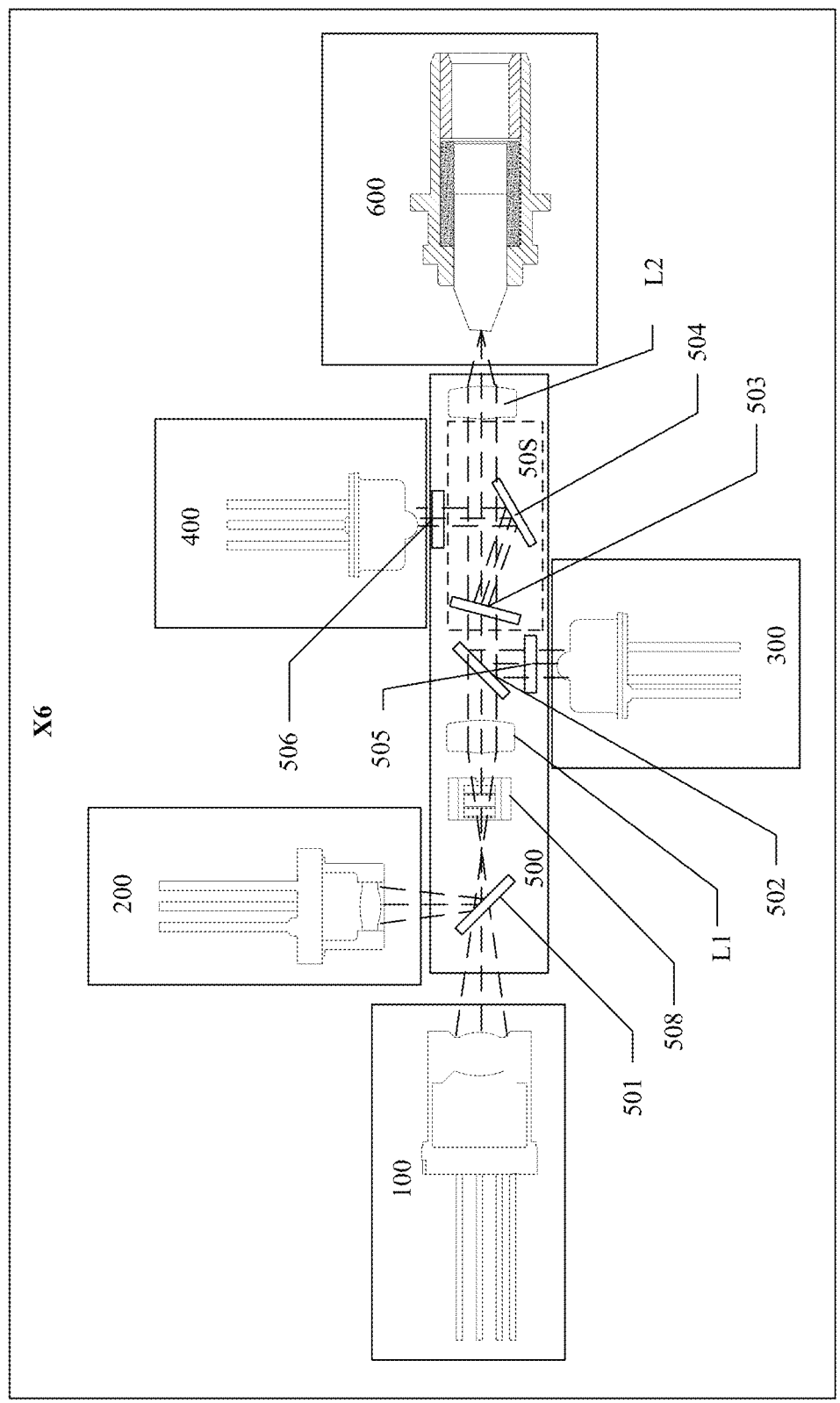
FIG. 6 is a schematic diagram of a structure of still another optical communication device according to an embodiment of this application.

FIG. 6 is a schematic diagram of a structure of still another optical communication device X6 according to an embodiment of this application. In the optical communication device X6 illustrated in this figure, structures of four ends (100, 200, 300, and 400) are basically the same as those in FIG. 1. Therefore, the structures of the four ends are not described herein again. In addition, passive devices (the first lens L1, the optical isolator 508, and the light filters 501 to 506) included in the optical communication device X4 shown in FIG. 4 are also included in the optical path component 500 in the optical communication device X6. In the foregoing embodiments, manners in which the foregoing passive devices are disposed and functions of the passive devices have been described one by one. Therefore, details are not described herein again.

It should be noted that, in the optical communication device X6 provided in this embodiment of this application, the optical isolator 508, the fifth light filter 505, and the sixth light filter 506 are all optional passive devices, but are not necessary passive devices.

Different from the device X4 shown in FIG. 4, the optical path component 500 in the optical communication device provided in FIG. 6 further includes a second lens L2. The second lens L2 is disposed between a light filter component 50S and an optical fiber adapter 600. The second lens L2 is configured to: converge, to the optical fiber adapter 600, a light beam provided by the light filter component 50S; and when receiving a light beam from the optical fiber adapter 600, converge the light beam, and provide a converged light beam to the light filter component 50S.

In some embodiments, both a first light beam and a second light beam may be light beams emergent in parallel, or may be light beams emergent in a converging manner. When both the first light beam transmitted by the first optical transmitting device 100 and the second light beam transmitted by the second optical transmitting device 200 are converging light beams, both the first lens L1 and the second lens L2 may be collimation lenses.

For ease of understanding, the first light beam is used as an example for description. As shown in FIG. 6, after the first optical transmitting device 100 transmits a converging light beam (that is, the first light beam), the light beam enters the first lens L1 after passing through the first light filter 501, and the first lens L1 converts the light beam into parallel light. The parallel light successively passes through the optical isolator 508, the second light filter 502, the light filter component 50S, and the second lens L2, and is converted into a converging light beam again by the second lens L2, and finally the converging light beam is converged to the optical fiber adapter 600. Transmission of the second light beam is similar to that of the first light beam. To be specific, the second light beam is first converted into a parallel light beam by the first lens L1, then the parallel light beam is converted into a converging light beam by the second lens L2, and finally the converging light beam is converged to the optical fiber adapter 600. For the receive ends, an optical signal enters the optical path component 500 from the optical fiber adapter 600, the light beam is converted into a parallel light beam by the second lens L2, and light with a wavelength λ4 is provided to the second optical receiving device 400 through reflection performed by the light filter component 50S, and then converged to a photoelectric detection element through a second converging lens packaged in the second optical receiving device 400. In addition, light with a wavelength λ3 in the parallel light beam obtained through conversion performed by the second lens L2 is transmitted by the light filter component 50S and reflected by the second light filter 502, and provided to the first optical receiving device 300, and then is converged to a photoelectric detection element through a second converging lens packaged in the first optical receiving device 300.

In some embodiments, the optical isolator 508 may be disposed between the first lens L1 and the second light filter 502, as shown in FIG. 6. In another possible implementation, the optical isolator 508 may alternatively be disposed between the first light filter 501 and the first lens L1.

In FIG. 6, the light filter component 50S in the optical path component 500 includes a third light filter 503 and a fourth light filter 504. Similar to FIG. 3 and FIG. 5, to reduce a quantity of used light filters and simplify an optical path, the third light filter 503 and the fourth light filter 504 in the light filter component 50S in the optical path component 500 shown in FIG. 6 may alternatively be replaced with an independent seventh light filter 507. For details, refer to an optical communication device X7 shown in FIG. 7. A light wave with the wavelength λ4 can be reflected to the second optical receiving device 400 by performing reflection by the seventh light filter 507 at a time. In this way, a quantity of light filters is reduced, thereby further simplifying an optical path.

In the optical communication devices shown in FIG. 4 to FIG. 7, to reduce a quantity of dimensions of optical coupling between internal devices, assembly may be performed in the following manner:

FIG. 4 is used as an example. In a possible assembly manner, the first lens L1 and the optical fiber adapter 600 are used as an integrated first structural member, and then the first optical transmitting device 100 and the first structural member are optically coupled to form a second structural member. By analogy, the remaining transmit end or remaining receive ends are optically coupled to a newly formed structural member one by one to finally obtain the optical communication device X4 shown in FIG. 4.

FIG. 4 is still used as an example. In another possible assembly manner, the first lens L1 and the first optical transmitting device 100 are used as an integrated third structural member, and then the optical fiber adapter 600 and the third structural member are optically coupled to form a fourth structural member. By analogy, the remaining transmit end or remaining receive ends are optically coupled to a newly formed structural member one by one to finally obtain the optical communication device X4 shown in FIG. 4.

Each time a structural member is added, a quantity of coupling dimensions needs to be increased by 3. In some embodiments of this application, through integrated structural member assembly, a quantity of dimensions of optical coupling is reduced, and a time required for assembly is also reduced, thereby improving production efficiency.

Figure 7:
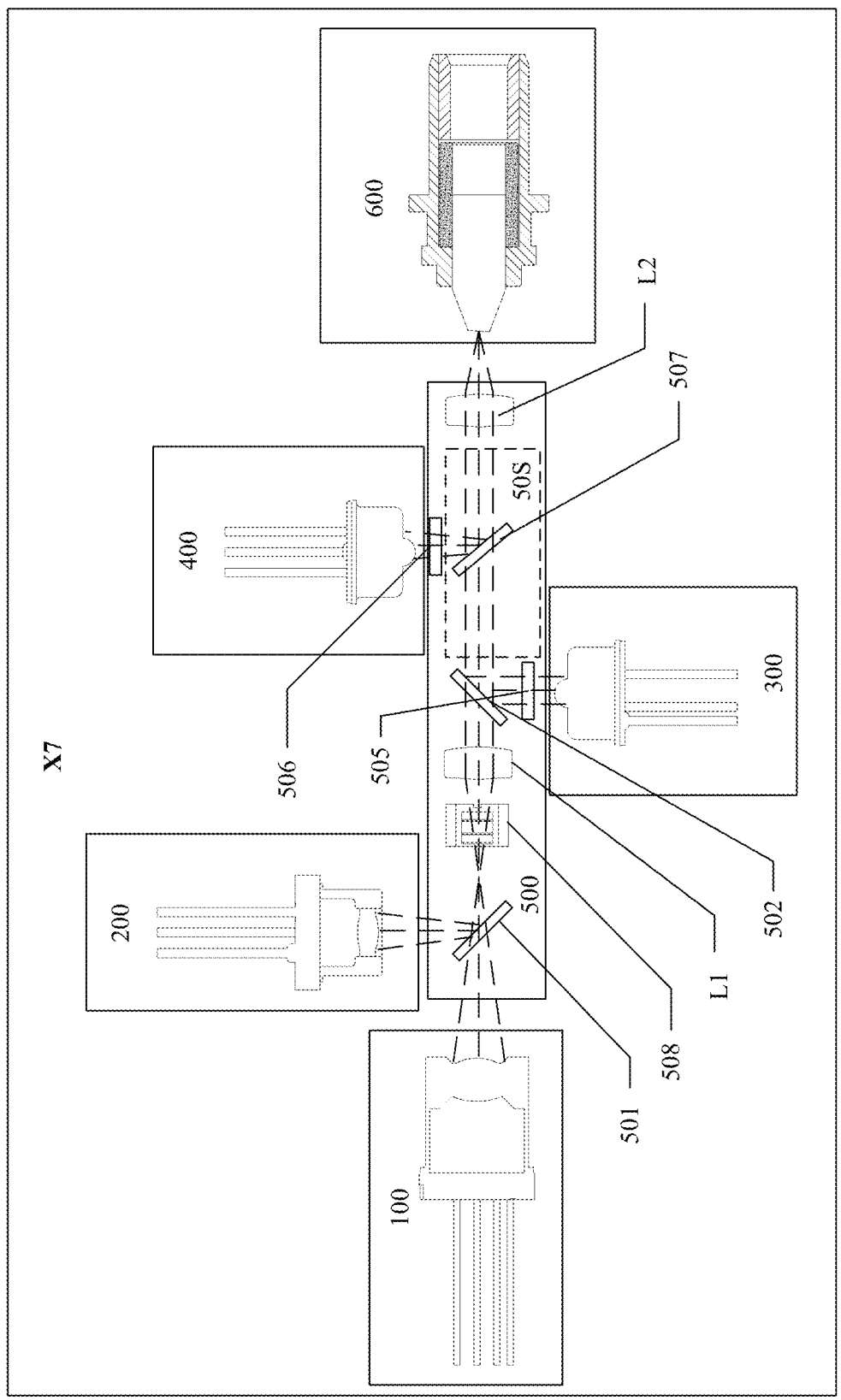
FIG. 7 is a schematic diagram of a structure of yet another optical communication device according to an embodiment of this application.

In addition, for the optical communication devices shown in FIG. 6 and FIG. 7, the second lens L2 is closer to the optical fiber adapter 600 than the first lens L1. Therefore, during specific implementation, in a possible assembly manner, alternatively, the second lens L2 and the optical fiber adapter 600 may be used as an integrated fifth structural member, and the first lens L1 and the fifth structural member may be optically coupled. By analogy, the remaining devices are optically coupled to a newly formed structural member one by one to finally obtain, through assembly, the optical communication devices shown in FIG. 6 and FIG. 7.

Based on the optical communication devices X1-X7 provided in the foregoing embodiments, correspondingly, this application further provides an optical signal processing method. The following describes specific implementation of the method. It should be noted that, the method may be applied to the optical communication device provided in any one of the foregoing embodiments.

The optical signal processing method includes:
when both the first optical transmitting device and the second optical transmitting device are in a transmitting state, combining, by using the optical path component, light beams transmitted by the first optical transmitting device and the second optical transmitting device, and sending a combined light beam to the optical fiber adapter; and
processing the light beam from the optical fiber adapter when the light beam is received, and sending a processed light beam to a corresponding optical receiving device in the first optical receiving device and the second optical receiving device.

It can be understood that, execution of the method depends on operating states of the first optical transmitting device and the second optical transmitting device and whether an optical signal is transmitted to the optical fiber adapter. In actual application, the optical communication device may need to simultaneously receive and send optical signals.

In some embodiments of this application, the optical path component in the optical communication device is mainly used to process a light beam. In the foregoing embodiments, a plurality of variant structures of the optical path component and a process of processing a light beam by the optical path component are described in detail. Therefore, for brevity, a process of processing a light beam is not described herein again.

When an optical signal enters from the optical fiber adapter, and the optical signal includes a light wave with a third wavelength (λ3) and a light wave with a fourth wavelength (λ4), the optical path component has a wave splitting function. The third wavelength is a target operating wavelength of the first optical receiving device, and the fourth wavelength is a target operating wavelength of the second optical receiving device. Therefore, the processing the light beam, and sending a processed light beam to a corresponding optical receiving device in the first optical receiving device and the second optical receiving device includes:
when the light beam from the optical fiber adapter includes a light beam with the third wavelength and a light beam with the fourth wavelength, splitting the light beam from the optical fiber adapter, sending the light beam with the third wavelength to the first optical receiving device, and sending the light beam with the fourth wavelength to the second optical receiving device.

After the light beam is split and the light beams obtained through splitting are sent to the corresponding optical receiving devices, the first optical receiving device converts the optical signal with the third wavelength into an electrical signal to complete a PON service served by the first optical receiving device, and the second optical receiving device converts the optical signal with the fourth wavelength into an electrical signal to complete a PON service served by the second optical receiving device.

In the foregoing method embodiment, optical signal processing is completed by using the optical communication device provided in embodiments of this application. In the optical communication device provided in embodiments of this application, there is no need to provide five or even more lenses in the optical path component to construct a parallel optical path. Therefore, an optical path is simple, and production costs of the device are low. Correspondingly, optical signal processing, transmission, and conversion are implemented at low costs.

In addition, it should be noted that, in embodiments of this application, optical parameters of the first converging lenses packaged in the first optical transmitting device 100 and the second optical transmitting device 200 may be the same or different. Optical parameters of the second converging lenses packaged in the first optical receiving device 300 and the second optical receiving device 400 may be the same or different. In actual application, first converging lenses and second converging lenses matching optical parameters may be selected based on requirements for relative distances between components in the optical communication device, a transmission characteristic of an optical signal in the components, transmission performance of the components, and other aspects.

It should be understood that, in this application, "a plurality of" means two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" usually indicates an "or" relationship between associated objects.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. An optical communication device, comprising a first optical transmitting device, a second optical transmitting device, a first optical receiving device, a second optical receiving device, an optical path component, and an optical fiber adapter, the optical path component comprising a primary light filter, a secondary light filter, a third light filter, a fourth light filter, and a first lens disposed between the third light filter and the fourth light filter, wherein
   a light source and a first converging lens are packaged in each of the first optical transmitting device and the second optical transmitting device, and the first converging lens is configured to: converge a first light beam emitted by the light source, and provide a converged first light beam to the optical path component;
   the optical path component is configured to: combine converged first light beams from the first optical transmitting device and the second optical transmitting device, and send a combined light beam to the optical fiber adapter;
   the optical path component is further configured to:
      receive a second light beam from the optical fiber adapter,
      send a light beam of a first wavelength in the second light beam to the first optical receiving device by transmitting the light beam of the first wavelength through the primary light filter; and
      send a light beam of a second wavelength in the second light beam to the second optical receiving device by reflecting the light beam of the second wavelength from the primary light filter to the secondary light filter and then reflecting the light beam of the second wavelength from the secondary light filter to the second optical receiving device;
   a second converging lens and a photoelectric detection element are packaged in each of the first optical receiving device and the second optical receiving device, and the second converging lens is configured to converge the second light beam received by the optical path component, and provide a converged second light beam to the photoelectric detection element;
   the third light filter is disposed on a transmission path of a light beam transmitted by the first optical transmitting device and on a transmission path of a light beam transmitted by the second optical transmitting device;
   the fourth light filter is disposed on a transmission path of the second light beam from the optical fiber adapter;
   the first lens is configured to converge a light beam from the third light filter, and provide a converged light beam or a parallel light beam to the fourth light filter.

2. The optical communication device according to claim 1, wherein the optical path component further comprises a light filter component;
   the third light filter is configured to transmit the light beam transmitted by the first optical transmitting device and reflect the light beam transmitted by the second optical transmitting device;
   the light filter component is disposed on the transmission path of the second light beam from the optical fiber adapter, wherein
   the fourth light filter is configured to reflect the light beam of the first wavelength in the second light beam from the optical fiber adapter to the first optical receiving device; and
   the light filter component is configured to reflect the light beam of the second wavelength in the second light beam from the optical fiber adapter to the second optical receiving device.

3. The optical communication device according to claim 2, wherein the fourth light filter is further configured to provide, to the optical fiber adapter through transmission, the converged light beam provided by the first lens.

4. The optical communication device according to claim 3, wherein the optical path component further comprises a second lens, the second lens is disposed between the light filter component and the optical fiber adapter; the second lens is configured to:
   converge, to the optical fiber adapter, a light beam provided by the light filter component; and
   converge a light beam provided by the optical fiber to the light filter component.

5. The optical communication device according to claim 2, wherein the primary light filter and the second optical receiving device are located on a same side of the secondary light filter; and
   the primary light filter is disposed between the fourth light filter and the optical fiber adapter.

6. The optical communication device according to claim 2, wherein the optical path component further comprises a third light filter, wherein
   the third light filter is disposed between the first optical receiving device and the fourth light filter; and the third light filter is perpendicular to an optical axis of the second converging lens packaged in the first optical receiving device, and is configured to further filter the light beam of the first wavelength reflected by the fourth light filter.

7. The optical communication device according to claim 2, wherein the optical path component further comprises a third light filter, wherein
the third light filter is disposed between the second optical receiving device and the light filter component; and the third light filter is perpendicular to an optical axis of the second converging lens packaged in the second optical receiving device, and is configured to further filter the light beam of the second wavelength reflected by the light filter component.

8. The optical communication device according to claim 2, wherein the optical path component further comprises an optical isolator, and the optical isolator is disposed between the third light filter and the fourth light filter, and is configured to isolate light transmitted from the fourth light filter to the third light filter.

9. The optical communication device according to claim 8, wherein a wavelength of the light beam transmitted by the first optical transmitting device and a wavelength of the light beam transmitted by the second optical transmitting device both fall within a waveband of a wave that can be isolated by the optical isolator.

10. The optical communication device according to claim 2, wherein the first converging lens packaged in the first optical transmitting device and/or the second optical transmitting device is an aspheric lens.

11. The optical communication device according to claim 2, wherein both the light beam transmitted by the first optical transmitting device and the light beam transmitted by the second optical transmitting device are converging light beams.

12. The optical communication device according to claim 3, wherein both the light beam transmitted by the first optical transmitting device and the light beam transmitted by the second optical transmitting device are parallel light beams.

13. The optical communication device according to claim 2, wherein both the first optical transmitting device and the second optical transmitting device are packaged according to a TO56 package specification, and both the first optical receiving device and the second optical receiving device are packaged according to a TO46 package specification.

14. The optical communication device according to claim 3, wherein the first lens and the optical fiber adapter jointly serve as an independent first structural member, and the first optical transmitting device and the first structural member are optically coupled to form a second structural member.

15. The optical communication device according to claim 3, wherein the first lens and the first optical transmitting device jointly serve as an independent third structural member, and an optical fiber coupler and the third structural member are optically coupled to form a fourth structural member.

16. An optical signal processing method, wherein the method is applied to the optical communication device according to claim 1, and the method comprises:
when both the first optical transmitting device and the second optical transmitting device are in a transmitting state, combining, by the optical path component, light beams transmitted by the first optical transmitting device and the second optical transmitting device, and sending a combined light beam to the optical fiber adapter; and
processing a light beam from the optical fiber adapter when the combined light beam is received, and sending a processed light beam to a corresponding optical receiving device in the first optical receiving device and the second optical receiving device.

17. The method according to claim 16, wherein the processing the light beam from the optical fiber adapter when the light beam is received, and sending the processed light beam to the corresponding optical receiving device in the first optical receiving device and the second optical receiving device comprises:
when the light beam from the optical fiber adapter comprises a light beam with a first wavelength and a light beam with a second wavelength, splitting the light beam from the optical fiber adapter, sending the light beam with the first wavelength to the first optical receiving device, and sending the light beam with the second wavelength to the second optical receiving device.

* * * * *